(12) United States Patent
Delpiano et al.

(10) Patent No.: US 6,582,486 B1
(45) Date of Patent: Jun. 24, 2003

(54) SOLID COMBUSTIBLE COMPOSITION

(75) Inventors: Gian Carlo Delpiano, Gallarate (IT); Gianpaolo Giuliani, Pavia (IT); Luca Zucchelli, Novate Milanese (IT)

(73) Assignee: Pirelli Ambient S.p.A., Milan (IT)

( * ) Notice: Subject to any disclaimer, the term of this patent is extended or adjusted under 35 U.S.C. 154(b) by 154 days.

(21) Appl. No.: 09/716,467

(22) Filed: Nov. 21, 2000

Related U.S. Application Data

(62) Division of application No. 09/222,709, filed on Dec. 29, 1998, now Pat. No. 6,152,974.
(60) Provisional application No. 60/083,799, filed on May 1, 1998.

(30) Foreign Application Priority Data

Dec. 30, 1997 (IT) .......................... MI97A0289

(51) Int. Cl.⁷ ................................. C10L 5/00
(52) U.S. Cl. ............... 44/589; 44/593; 44/594; 44/595; 44/605; 44/628; 431/2
(58) Field of Search .................. 44/593, 594, 595, 44/589, 605, 628; 431/2

(56) References Cited

U.S. PATENT DOCUMENTS

| 1,770,627 A | 7/1930 | Roberts |
| 3,759,196 A | 9/1973 | Spaite |
| 4,049,391 A | 9/1977 | Marsh |
| 4,152,119 A | 5/1979 | Schulz |
| 4,552,666 A | 11/1985 | Muller |
| 4,615,711 A | 10/1986 | Muller |
| 4,692,167 A | 9/1987 | Levasseur |
| 5,387,267 A | 2/1995 | Warf et al. |
| 5,429,645 A | 7/1995 | Benson et al. |
| 5,888,256 A | 3/1999 | Morrison |
| 6,152,974 A * | 11/2000 | Delpiano et al. ............. 44/593 |
| 6,375,691 B1 * | 4/2002 | Zucchelli et al. ............. 44/605 |

FOREIGN PATENT DOCUMENTS

| DE | 24 36 267 | 2/1976 |
| EP | 0 191 691 | 8/1986 |
| EP | 0 237 689 | 9/1987 |
| FR | 2 702 488 | 9/1994 |
| GB | 2 237 028 | 4/1991 |
| WO | WO 82/02560 | 8/1982 |

* cited by examiner

Primary Examiner—Margaret Medley
(74) Attorney, Agent, or Firm—Finnegan, Henderson, Farabow, Garrett & Dunner, L.L.P.

(57) ABSTRACT

A solid combustible composition having an apparent density lower than 0.6 g/cm³ and comprising a first portion consisting of an urban solid waste, a second portion consisting of elastomeric material and a third portion consisting of non-elastomeric polymeric material.

47 Claims, 2 Drawing Sheets

SOLID COMBUSTIBLE COMPOSITION

This is a divisional of application Ser. No. 09/222,709, filed Dec. 29, 1998 now U.S. Pat. No. 6,152,974 incorporated herein by reference in its entirety.

This application is based on application No. MI97A 02890 filed in Italy and U.S. Provisional Application No. 60/083,799 filed on May 1, 1998, the content of which is incorporated hereinto by reference.

This invention relates to a solid combustible composition comprising a first portion consisting of an urban solid waste, a second portion consisting of elastomeric material and a third portion consisting of a non-elastomeric polymeric material.

Up to now many methods have been proposed to destroy and/or recover, at least partially, urban solid wastes, out of use tyres and plastic packaging materials.

However, the problem is very complex owing to the fact that the nature and composition of the wastes varies from place to place and from day to day, and owing to the presence of a perishable organic portion.

Some of the methods proposed up today imply the removal of the perishable organic phase from the solid products which are then dried, crumbled and agglomerated. Generally this agglomeration is performed via compression into granules or bricks.

According to the Applicant's perception, a drawback of these methods is that the caloric power of the obtained solid combustible material varies from batch to batch. Another drawback is that some kinds of boilers and burners, such as the instantaneous combustion ones, can not be fed with a combustible agglomerated into granules or bricks. Still another drawback is that the granule and brick preparation comprises some steps, such as the compression step, involving a certain energetic expenditure and, therefore, a cost increase which renders uneconomical the above known methods.

Now a combustible composition has been found which can be produced avoiding the agglomerate formation.

According to a first aspect, this invention relates to a solid combustible composition comprising a first portion consisting of an urban solid waste, a second portion consisting of an elastomeric material and a third portion consisting of a non-elastomeric polymeric material, characterised in that it has an apparent density lower than 0.6 g/cm$^3$.

According to a second aspect, the first portion consisting of urban solid wastes is suitably crumbled and dried separately until it has a moisture contents $\leq 10\%$. Preferably, also the two other portions are suitably crumbled. The amount of each of the three portions is not critical and varies according to the caloric power pre-selected for the composition of this invention.

Typically, a solid combustible composition of the present invention comprises a first portion consisting of an urban solid waste, a second portion consisting of an elastomeric material and a third portion consisting of a non-elastomeric polymeric material and is characterised in that:

the urban solid waste has a moisture contents $\leq 10\%$, each of the three portions is crumbled separately in a controlled way, the three crumbled portions are mixed together so as to obtain a mixture having a selected caloric power.

Typical examples of elastomeric materials useful to prepare the composition of this invention are the out of use tyres.

Typical examples of non-elastomeric polymeric materials useful to prepare the composition of this invention are the packages and the wrappings made of thermoplastic and/or thermosetting materials. Typical examples of thermoplastic materials used in the packing field are PE, LDPE, HDPE, PP, PET, polystyrene, ethylene/α-olefines $C_4$–$C_{12}$ copolymers, vinyl-polymers and copolymers and the like.

There are no particular limitations to the percentage ratios of these portions; these ratios being mainly predetermined depending on the caloric power pre-selected for the combustible composition of this invention. Typically, the composition of this invention shall comprise 40 to 80% by weight of an urban solid waste, 10 to 50% by weight of an elastomeric material and 10 to 50% by weight of a non-elastomeric polymeric material. Preferably it shall comprise 60 to 80% by weight of an urban solid waste, 10 to 30% by weight of an elastomeric material and 10 to 30% by weight of a non-elastomeric polymeric material.

Typically the average size of urban solid wastes in the combustible composition of this invention is $\leq 60$ mm and, preferably $\leq 25$ mm. The average size of the elastomeric material is $\leq 10$ mm, preferably $\leq 5$ mm and, still, more preferably $\leq 1$ mm. The average size of the non-elastomeric polymeric material is $\leq 40$ mm and, preferably $\leq 15$ mm.

Preferably the apparent density of the combustible composition of this invention is $\leq 0.4$ g/cm$^3$. Still more preferably it is of from 0.3 and 0.1 g/cm$^3$.

The caloric power of the combustible composition of this invention will be chosen by a person skilled in the art depending on the thermal requirements of the plant used, by suitably selecting the amount by weight of each portion according to its own caloric power.

Generally, it will be of 4,000 to 6,000 Kcal/kg. Still more preferably it will be of 4,500 to 5,500 Kcal/kg.

The inventors perceived that the solid combustible composition of this invention is particularly advantageous when the average size of the elastomeric material is of about 1 mm because it can thus be used to feed also instantaneous combustion plants. That means, those plants where the combustible is burned almost completely in a very short time, typically in less than 10 seconds, preferably in less than 3 seconds.

The method of this invention implies the trituration of urban solid wastes after separation of the perishable organic portion, as well as the iron and aluminium materials.

It further implies the trituration of the plastic materials, preferably together with the said urban solid waste.

Urban solid wastes and tritured plastic materials are conveyed to a hot-air drier and then to a mill where they undergo a further crushing.

The tyres, in their turn, are crushed and deprived of the iron material. In case of huge tyres, before crushing it is preferable to remove the bead.

A second aspect of this invention consists, therefore, of a process where:

a) an urban solid waste is treated to remove
  $a_1$) the perishable organic portion via screening,
  $a_2$) the iron materials by means of a magnetic separator,
  $a_3$) aluminium by means of an eddy-current magnet, b) the thus obtained urban solid portion is tritured, c) a waste material consisting of a non-elastomeric polymeric material is tritured, d) the above portions of tritured urban solid wastes and non-elastomeric polymeric material are dried until their moisture content is equal to or lower than 10%, e) the above portions are ground into bits, f) an elastomeric material is ground into bits and deprived of any iron material associated thereto, g) the above bits of urban solid wastes, non-elastomeric polymeric material and elastomeric material are mixed together in a weight ratio which is predetermined in view of the desired caloric power.

According to a further aspect, this invention relates to a process for preparing a solid combustible composition characterised in that non-agglomerated bits of urban solid wastes, non-elastomeric polymeric material and elastomeric material are mechanically mixed together in a weight ratio so as to give a solid combustible composition having a caloric power of from 4,000 to 6,000 Kcal/Kg; preferably, of from 4,500 to 5,500 Kcal/Kg.

The invention shall be now explained in a greater detail by means of the figures and the examples which follow:

Figure 1:
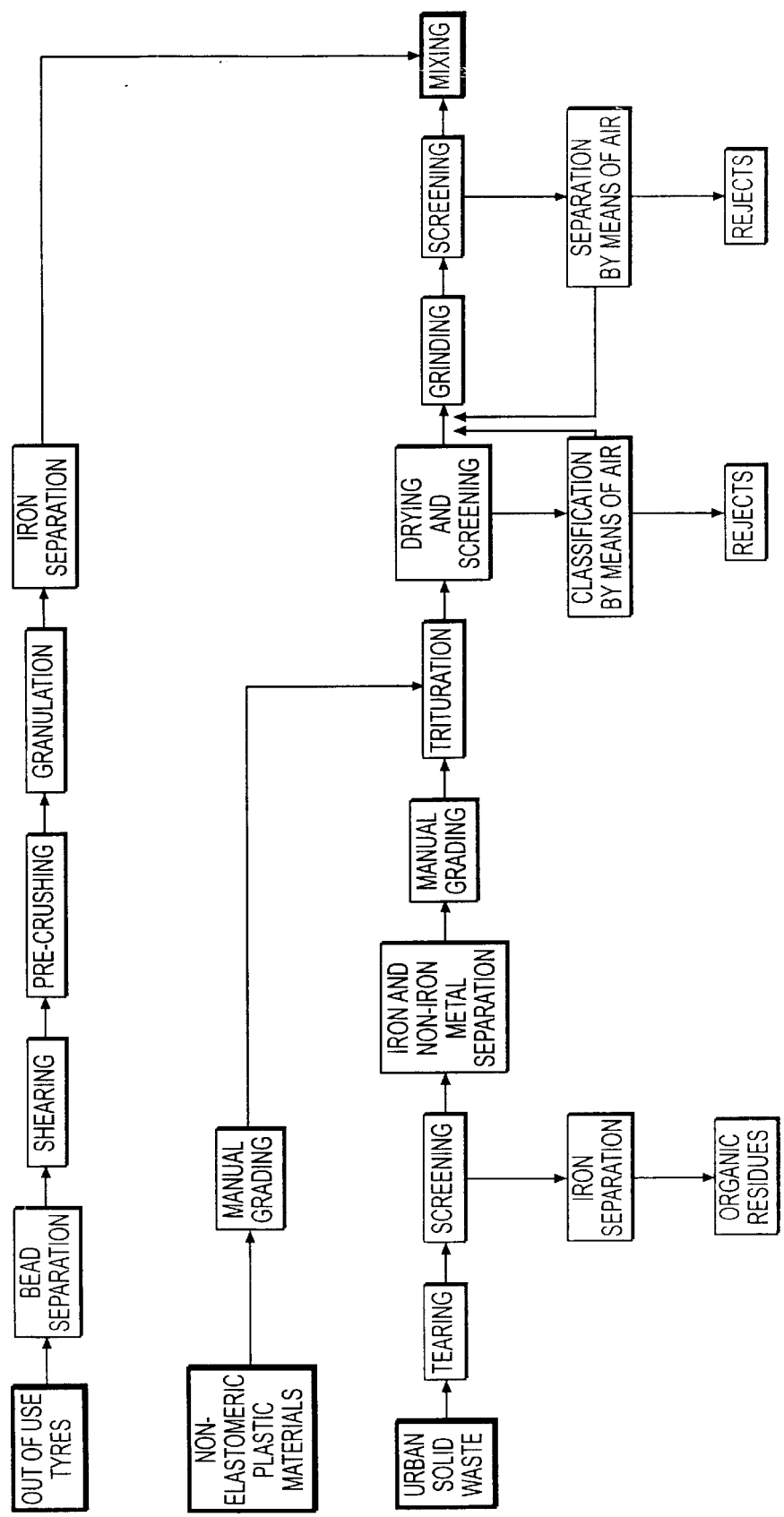
FIG. 1 is a block diagram showing an embodiment of the process for the production of the solid combustible composition of the invention.
Figure 2:
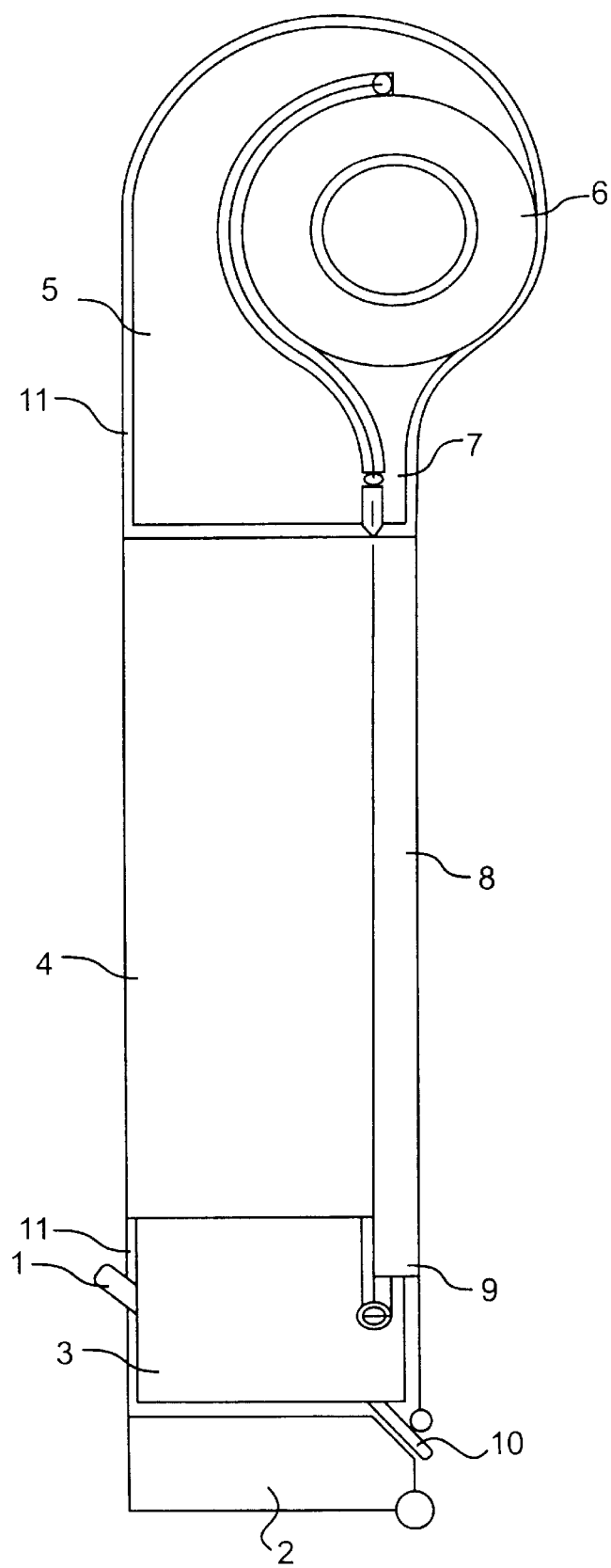
FIG. 2 is the operation diagram of the furnace wherein the combustion tests on the solid combustible composition of the invention have been carried out.

The furnace of FIG. 2 comprised a feeding inlet 1, a fluid-bed process air distribution chamber 2, a fluid-bed process zone 3, a cooling zone 4, a cyclone 6 provided with an inlet 5, an inlet 7 to a recycle duct 8, an outlet 9 of the recycle duct, an outlet for the discharge of the ashes and a refractory shell 11.

The following examples are intended to illustrate this invention without, however, limiting it in any way.

EXAMPLE 1

A) Urban Solid Wastes Treatment

Urban solid wastes (USW) are discharged into hoppers provided with mechanical rubberised blades and conveyed on a conveyor belt which carries them at first to a tearing machine and then to a screen. The perishable organic portion, forming about 50% of the USW discharged into the hopper, and the iron materials passed through the screen, fall on a conveyor belt, onto which a magnetic separator is placed to separate the iron materials, while the perishable organic material is conveyed to a suitable collecting station.

The USW portion remained on the screen passes to another conveyor belt, above which there are installed a magnetic separator of iron materials and an eddy current separator of aluminium, consisting for example of a conveyor belt on which the current to be treated is fed and provided with a head pulley provided with a rare earth permanent magnet system. This system induces eddy currents able to temporarily magnetize the non-magnetic conductor materials which can therefore feel the effects of a magnetic field. The aluminium fragments are projected lengthwise against a suitable baffle and fall into a hopper which discharge them on a belt conveyor system carrying them to a suitable station.

USW deprived of the perishable organic phase as well as of the iron and aluminium material undergoes a manual grading which has the aim of removing, from the substantially dry and combustible portion, both the residual organic rejects and the unwanted portions optionally still present in USW. After that grading, USW is conveyed to a knife trituration device consisting of two low speed counter-rotating shafts provided with thick blades preferably equipped with spout-shaped appendixes drawn from steel disks integral to the shafts which allow and facilitate the material seizing operation.

In this trituration step, the non-elastomeric polymeric material (consisting mainly of PET and PE) coming from the pre-treatment described in the following paragraph B can be added to USW.

The tritured material is fed to a drier hopper having a screening section in its terminal portion. The drier consists preferably of a cylinder rotating around a nearly horizontal axis into which air is blown, in equicurrent, heated by means of a suitable burner. The walls of the drier initial portion are made of a not perforated plate to facilitate the drying, while the walls of the final portion are perforated to act as a screen and separate the material having a size lower than a determined value such as, for example, 30 mm.

The material passing through the screen holes (smaller size) may still contain, together with paper and plastic materials, unwanted residual organic substances and inert substances. To separate the paper and the plastic materials from the residual organic substances and the inert substances, an air classifier sucking only the lightest substances consisting just, to a considerable degree, of paper and plastic materials, is placed on the belt which conveys the said small sized material to a suitable station.

The material which does not pass through the screen holes (greater size) is conveyed to a hammer mill where it rejoins the material recovered by means of the air classifier.

The hammer mill consists of a strong chamber provided with a horizontal axis shaft on which steel hammers are fixed while, inside the chamber, a fixed counterhammering is housed.

A grate provided with openings of predetermined dimensions, allows the discharge from the mill only of the ground material having a size lower than the dimensions of the openings of the said grate. The material being discharged is conveyed to a conveyor belt which carries it to a vibrating screen having the aim of guaranteeing a homogenous size of the material being discharged. The thinnest portion outgoing from the vibrating screen passes to the following mixing step described in the following paragraph D of this example, while the coarser portion is recycled by sending it again to the mill.

B) Non-elastomeric Polymeric Material Treatment

The non-elastomeric polymeric material can be added to USW in the knife trituration device or be submitted, separately, to the same treatment which USW undergoes from the trituration step to the end of the treatment described in paragraph A.

C) Elastomeric Material Treatment (Out of Use Tyres)

The huge tyres are firstly deprived of the bead steel cables and then treated as the car tyres.

The treatment comprises the reduction into pieces by manual shearing. Then they are conveyed to a precrusher to be reduced into pieces of 5–6 cm and to a granulator to be reduced into pieces lower than about 2 cm.

The thus obtained granules are deprived of iron and used as described in the following paragraph D.

D) Mixing

The materials treated as described in the previous paragraphs A (with plastic materials) and C, or A (without plastic materials), B and C, are mixed according to predetermined ratios to obtain a solid combustible having a moisture contents $\leq 10\%$ and a pre-selected caloric power.

EXAMPLE 2

For the combustion tests, a fluid bed furnace was used, of the recycling type, capable of burning solid combustibles (powder coal), solid wastes, pasty wastes (industrial and urban muds) and various liquids (refinery sludges, used oils and exhausted solvents).

The furnace is schematically shown in FIG. 2.

The solid combustible composition of the invention was fed to the furnace by means of a pneumo-mechanical system. The slag discharge carried out periodically in a discontinuous manner, was made by means of an extraction Archimedean screw.

The fluid bed consisted of flue gases and solid particles of the solid combustible composition of the invention mixed with a sand substratum and the produced ashes. At the top of the furnace of FIG. 2 the separation of solids-flue gases took place by means of a horizontal cyclone. The separated solids were recycled on the furnace bottom, while the flue gases passed to the convection zone.

The primary combustion air was sucked by a first fan together with the hot recycle flue gases and sent to the combustion chamber, while the secondary air was sent above the dense bed by means of a second fan.

The combustion plant was maintained at a low depression by modulating the suction of a third flue gases extracting fan which sent the flue gases to the purification zone.

The heat recovery, performed by means of a forced-circulation of water into the convection zone, designed for a flue gas outlet temperature of 250° C., and by means of natural convection in the diaphragmed walls of the combustion chamber, allowed the production of saturated steam at a pressure of 10 bars.

The operating conditions of the steam system had been adjusted by the steam drum level acting on the feeding water capacity and by the system pressure control acting on the adjusting device of the produced steam.

The fluid bed furnace has the following parameters:

| | |
|---|---|
| Thermal capacity | 1,8 MW$_t$ |
| Flue gases capacity | 2000 Nm$^3$/h |
| Combustion temperature | 850° C. |
| Flue gases speed in the bed | 4.0 m/s |
| Flue gas outlet temperature | 250° C. |
| Water cooling fluid with production of saturated steam at | 10 bars |

The flue gases coming from the thermal recovery area were introduced into a water cooling column (quench reactor). The column, being of the evaporating type, was carried out in equicurrent, as flue gases and water were introduced in the apparatus bottom and flowed towards the top.

The water introduction was performed by means of a nebulization nozzle and the temperature of the flow outgoing from the quench reactor was automatically controlled by changing the water amount charged in the column.

The cooled flue gases were treated according to known techniques.

The plant operation was controlled and adjusted in continuous as follows:
  the combustion temperature was adjusted by changing the primary air capacity and the hot flue gases recycle capacity;
  the residual oxygen content in the flue gases outgoing from the furnace was adjusted by adjusting the secondary air capacity;
  the fluid bed was maintained at a slight depression by modulating the suction of the flue gases extracting fan;
  the operating conditions of the steam system were adjusted by the steam drum level acting on the feeding water capacity and by the system pressure control acting on the adjusting device of the produced steam.

Two combustion tests were carried out: the first with an air excess of 55% and the second with an air excess of 45%.

During the interval between two combustion tests of solid combustible composition of the invention, the plant was maintained in temperature by means of a conventional fuel (Diesel oil).

During the period when the tests were carried out, 13 tons of solid combustible composition of the invention were burned (191.6 kg/h in the first test and 227.8 kg/h in the second test) having the following composition and features:

example 1A
 a) 70% by weight of urban solid wastes treated as described in

| | |
|---|---|
| Moisture | 17.41% by weight |
| Ashes | 11.08% by weight |
| Carbon | 34.12% by weight |
| Hydrogen | 6.21% by weight |
| Nitrogen | 0.80% by weight |
| Sulphur | 0.06% by weight |
| Chlorine | 0.45% by weight |
| Lower Heat Power | 3568 kcal/kg | b) 15% by weight of non-elastomeric polymeric material treated as described in example 1B)

| | |
|---|---|
| Moisture | 8.5% by weight |
| Ashes | 5.9% by weight |
| Carbon | 57.3% by weight |
| Hydrogen | 8.1% by weight |
| Nitrogen | 0.3% by weight |
| Sulphur | 0.2% by weight |
| Chlorine | 2.6% by weight |
| Lower Heat Power | 6629 kcal/kg | c) 15% by weight of elastomeric material from out of use tyres treated as described in example 1C)

| | rubber (~90%) | textile (~10%) |
|---|---|---|
| Moisture | 2.5 | 5.8% by weight |
| Ashes | 4.4 | 17.1% by weight |
| Carbon | 85.1 | 55.3% on dry |
| Hydrogen | 7.3 | 6.3% on dry |
| Nitrogen | 0.4 | 0.3% on dry |
| Sulphur | 2.3 | 1.1% on dry |
| Lower Heat Power | 8792 kcal/kg | |

The temperature of the plant was brought to 600° C. and the bed was fluidized according to known techniques.

Then the solid combustible composition of this invention was charged and the operating conditions were predetermined so as to maintain the temperature at the outlet from the furnace at about 850° C., that was equivalent to an average temperature of the bed of 810° C.

It has been found that is was advisable to prevent that the flue gases coming from the boiler could enter into contact with the feeding system in order to avoid that the counter pressure set up in the line and the moisture present in the flue gases pack the combustible composition of the invention in the mechanical conveying means and, particularly, in the conveying air filter.

With this arrangement, the combustion was maintained stable and constant and no significant inconvenience took place during all the prefixed time (37.5 hours).

The second test was carried out in the same conditions except that the temperature at the outlet from the furnace was of 900° C., the average temperature of the bed was of 860° C. and the test duration was of 22 hours.

Comparative Example

By employing the same burning plant two comparison tests were carried out with powdered coal of the Venezuelan type having the following properties:

| | |
|---|---|
| Moisture | 10.86% by weight |
| Ashes | 5.04% by weight |
| Carbon | 66.66% by weight |
| Hydrogen | 4.60% by weight |
| Nitrogen | 1.54% by weight |
| Sulphur | 0.51% by weight |
| Lower Heat Power | 6142 kcal/kg |

In the first test (49.5 hours) the air excess was of 40%, in the second test (46.5 hours) it was of 45%.

32 tons of coal were burnt in all.

The operating conditions were as those employed for the combustible composition of the invention, except that, having found that the combustion remained confined in the bed zone where temperatures were well above 900° C., the temperature at the furnace outlet was reduced (about 780° C.) operating in such a way to maintain the bed temperature at about 925° C.

The second test with coal was carried out as the previous one, except that the temperature at the furnace outlet was of about 800° C. and the bed temperature was of about 890° C. and a lower amount of coal (about 10–15% less) was fed.

The comparison of the analytical data collected in the tests described in example 2 and the comparative example have shown that:

$SO_2$ content in the flue gases flowing from the combustion chamber is of about 700 mg/Nmc for coal and about 300 mg/Nmc for the combustible composition of the invention, with a favourable reduction higher than 50%;

nitrogen oxides content, expressed as $NO_2$, is of about 250 mg/Nmc for coal and about 150 mg/Nmc for the combustible composition of the invention;

coal gives a higher amount of not burnt substances;

hydrochloric acid content in the crude flue gases is of about 5 mg/Nmc in the tests with coal and about 150 mg/Nmc in the tests with the combustible composition of the invention. On the other hand, the last value is lower than that expected in view of the nature of the materials used to produce the combustible composition of the invention;

the heavy metals concentration values in the flue gases flowing to the chimney were as expected in view of the nature of the materials except a substantial reduction in the chromium level for the combustible composition of the invention and a concomitant increase in the zinc level—mainly due to the presence of the tyre material—which, however, can be brought to more favourable values by taking the necessary measures when preparing the solid combustible composition of the invention.

The efficiency of the thermal recovery obtained with the two combustibles during the experimental tests resulted to be substantially comparable. It was in fact of 78–79% for coal and 76–77% for the combustible composition of the invention.

What is claimed is:

1. A solid non-agglomerated combustible composition comprising a mixture of:
   (a) a triturated, dried, and ground urban solid wastes having removed therefrom perishable organic portions, iron materials and aluminium, and having a moisture content equal to or less than 10%;
   (b) a triturated, dried, and ground non-elastomeric polymeric material having a moisture content equal to or less than 10%:
   (c) a ground elastomeric material having iron material removed therefrom:
   said mixture having an apparent density lower than 0.6 g/cm$^3$.

2. A solid combustible composition according to claim 1, having a caloric power of from 4,500 to 5,500 kcal/kg.

3. A solid combustible composition according to claim 1 wherein the content of urban solid wastes is of from 40 to 80% by weight.

4. A solid combustible composition according to claim 3, wherein the content of urban solid wastes is of from 60 to 80% by weight.

5. A solid combustible composition according to claim 1, wherein the content of elastomeric material is from 10 to 50% by weight.

6. A solid combustible composition according to claim 5, wherein the content of elastomeric material is from 10 to 30% by weight.

7. A solid combustible composition according to claim 1, wherein the content of non-elastomeric polymeric material is from 10 to 50% by weight.

8. A solid combustible composition according to claim 7, wherein the content of non-elastomeric polymeric material is from 10 to 30% by weight.

9. A solid combustible composition according to claim 1, wherein the average size of urban solid wastes is ≦60 mm.

10. A solid combustible composition according to claim 9, wherein the average size of urban solid wastes is ≦25 mm.

11. A solid combustible composition according to claim 1, wherein the average size of the elastomeric material is ≦10 mm.

12. A solid combustible composition according to claim 11, wherein the average size of urban solid wastes is ≦5 mm.

13. A solid combustible composition according to claim 12, wherein the average size of urban solid wastes is ≦1 mm.

14. A solid combustible composition according to claim 1, wherein the average size of the non-elastomeric polymeric material is ≦40 mm.

15. A solid combustible composition according to claim 14, wherein the average size of the non-elastomeric polymeric material is ≦15 mm.

16. A solid combustible composition according to claim 15, having an apparent density ≦0.4 g/cm$^3$.

17. A solid combustible composition according to claim 16, having an apparent density of from 0.3 to 0.1 g/cm$^3$.

18. A solid combustible composition according to claim 1, having a caloric power of from 4,000 to 6,000 kcal/kg.

19. A process of instantaneous combustion comprising continuously feeding to an instantaneous burning apparatus, a solid non-agglomerated combustible composition and subjecting said composition to combustion in said apparatus, said composition comprising a first portion of an urban solid waste, a second portion of a non-elastomeric material and a third portion of an elastomeric material, said composition having an apparent density lower than 0.6 g/cm$^3$.

20. A solid combustible composition comprising a product produced by the following steps:
  (a) removing perishable organic portions, iron materials and aluminum from urban solid wastes by:
    (i) screening the perishable organic portion,
    (ii) removing the iron materials by means of a magnetic separator,
    (iii) removing the aluminum by means of an eddy-current magnet,
  (b) triturating the urban solid wastes portion obtained after steps (a) (i)–(iii),
  (c) triturating a waste material consisting essentially of a non-elastomeric polymeric material,
  (d) drying the triturated urban solid wastes and triturated non-elastomeric material of steps (b) and (c) respectively to a moisture content equal to or lower than 10%,
  (e) grinding the portions obtained from step (d) into bits,
  (f) grinding an elastomeric material into bits wherein the elastomeric material has any iron material associated therewith removed prior to said grinding,
  (g) mixing together the bits of urban solid waste and non-elastomeric polymeric material of step (e) and the bits of elastomeric material of step (f) in a weight ratio so that the mixture obtained has an apparent density lower than 0.6 g/cm$^3$.

21. A product according to claim 20, wherein in step (e) the portion of urban solid wastes is ground up to an average size of $\leq 60$ mm.

22. A product according to claim 21, wherein in step (e) the portion of urban solid wastes is ground up to an average size of $\leq 25$ mm.

23. A product according to claim 20, wherein in step (e) portion of non-elastomeric polymeric material is ground up to an average size of $\leq 4$ mm.

24. A product according to claim 23, wherein in step (e) the portion of non-elastomeric polymeric material is ground up to an average size of $\leq 15$ mm.

25. A product according to claim 20, wherein in step (f) the portion of elastomeric material is ground up to an average size of $\leq 10$ mm.

26. A product according to claim 25, wherein in step (f) the portion of elastomeric material is ground up to an average size of $\leq 5$ mm.

27. A product according to claim 26, wherein in step (f) the portion of elastomeric material is ground up to an average size of $\leq 1$ mm.

28. A product according to claim 20, having a caloric power of from 4,000 to 6,000 kcal/kg.

29. A product according to claim 28, wherein said caloric power is from 4,500 to 5,500 Kcal/Kg.

30. The process of claim 19 wherein said solid non-agglomerated combustible composition comprises a mixture of:
  (a) said first portion which comprises a triturated, dried, and ground urban solid wastes having removed therefrom perishable organic portions, iron materials and aluminium, and having a moisture content equal to or less than 10%;
  (b) said second portion which comprises a triturated, dried, and ground non-elastomeric polymeric material having a moisture content equal to or less than 10%:
  (c) said third portion which comprises a ground elastomeric material having iron material removed therefrom:
  said mixture having an apparent density lower than 0.6 g/cm$^3$.

31. The process according to claim 30 wherein the content of urban solid wastes is of from 40 to 80% by weight.

32. The process according to claim 30, wherein the content of urban solid wastes is of from 60 to 80% by weight.

33. The process according to claim 19, wherein the content of elastomeric material is from 10 to 50% by weight.

34. The process according to claim 33, wherein the content of elastomeric material is from 10 to 30% by weight.

35. The process according to claim 33 wherein the content of non-elastomeric polymeric material is of from 10 to 50% by weight.

36. The process according to claim 35, wherein the content of non-elastomeric polymeric material is from 10 to 30% by weight.

37. The process according to claim 33, wherein the average size of urban solid wastes is $\leq 60$ mm.

38. The process according to claim 37, wherein the average size of urban solid wastes is $\leq 25$ mm.

39. The process according to claim 33 wherein the average size of the elastomeric material is $\leq 10$ mm.

40. The process according to claim 39, wherein the average size of urban solid wastes is $\leq 5$ mm.

41. The process according to claim 40, wherein the average size of urban solid wastes is $\leq 1$ mm.

42. The process according to claim 33, wherein the average size of the non-elastomeric polymeric material is $\leq 40$ mm.

43. The process according to claim 42, wherein the average size of the non-elastomeric polymeric material is $\leq 15$ mm.

44. The process according to claim 43, having an apparent density $\leq 0.4$ g/cm$^3$.

45. The process according to claim 44, having an apparent density of from 0.3 to 0.1 g/cm$^3$.

46. The process according to claim 33, where said composition has a caloric power of from 5,000 to 6,000 kcal/kg.

47. The process according to claim 33, where said composition has a caloric power of from 4,500 to 5,500 kcal/kg.

* * * * *

UNITED STATES PATENT AND TRADEMARK OFFICE
CERTIFICATE OF CORRECTION

PATENT NO. : 6,582,486 B1
DATED : June 24, 2003
INVENTOR(S) : Gian Carlo Delpiano et al.

It is certified that error appears in the above-identified patent and that said Letters Patent is hereby corrected as shown below:

<u>Title page,</u>
Item [73], Assignee, "Ambient" should read -- Ambiente --.

<u>Column 9,</u>
Line 34, "portion of" should read -- the portion of --.
Line 35, "≦4 mm." should read -- ≦40 mm. --.

Signed and Sealed this

Sixteenth Day of December, 2003

JAMES E. ROGAN
*Director of the United States Patent and Trademark Office*